(12) United States Patent
Ojima

(10) Patent No.: US 7,785,511 B2
(45) Date of Patent: Aug. 31, 2010

(54) METHOD FOR MOLDING RESIN-PRODUCT

(75) Inventor: Masaaki Ojima, Kawaguchi (JP)

(73) Assignee: Enplas Corporation, Kawaguchi-shi, Saitama (JP)

( * ) Notice: Subject to any disclaimer, the term of this patent is extended or adjusted under 35 U.S.C. 154(b) by 407 days.

(21) Appl. No.: 11/700,861

(22) Filed: Feb. 1, 2007

(65) Prior Publication Data

US 2007/0182056 A1    Aug. 9, 2007

(30) Foreign Application Priority Data

Feb. 3, 2006 (JP) .............................. 2006-026478
Dec. 22, 2006 (JP) .............................. 2006-346451

(51) Int. Cl.
*B28B 1/00* (2006.01)
(52) U.S. Cl. .................... 264/154; 264/328.1
(58) Field of Classification Search .................. 264/154, 264/239, 328.1
See application file for complete search history.

(56) References Cited

U.S. PATENT DOCUMENTS

2005/0146080 A1* 7/2005 Keirstead et al. .......... 264/328.1

FOREIGN PATENT DOCUMENTS

| JP | 2001-009871 | 1/2001 |
|---|---|---|
| JP | 2002-268513 | 9/2002 |

* cited by examiner

*Primary Examiner*—Kat Wyrozebski
*Assistant Examiner*—Xue Liu
(74) *Attorney, Agent, or Firm*—McDermott Will & Emery LLP

(57) ABSTRACT

The use of a molding die having a die cavity configured to define a shape of a resin-product having a shaft bore extending along the central axis to a predetermined depth and a bottom portion at one end thereof, a center pin having an axis thereof and configured to form the shaft bore and disposed in the die cavity, and a resin flow runner extending toward the die cavity on an extension line of the center pin, which extends in the axial direction, being formed outside the cavity, allows provision of a molding method enabling the resin-product to be mold of molten resin which is injected from a gate into the die cavity of the molding die through the resin flow runner and is solidified therein. A resin of the portion connecting to the gate in a resin-product member having been solidified in the die cavity is torn off, thereby forming a hole in the bottom portion of the shaft bore in the resin-product.

7 Claims, 14 Drawing Sheets

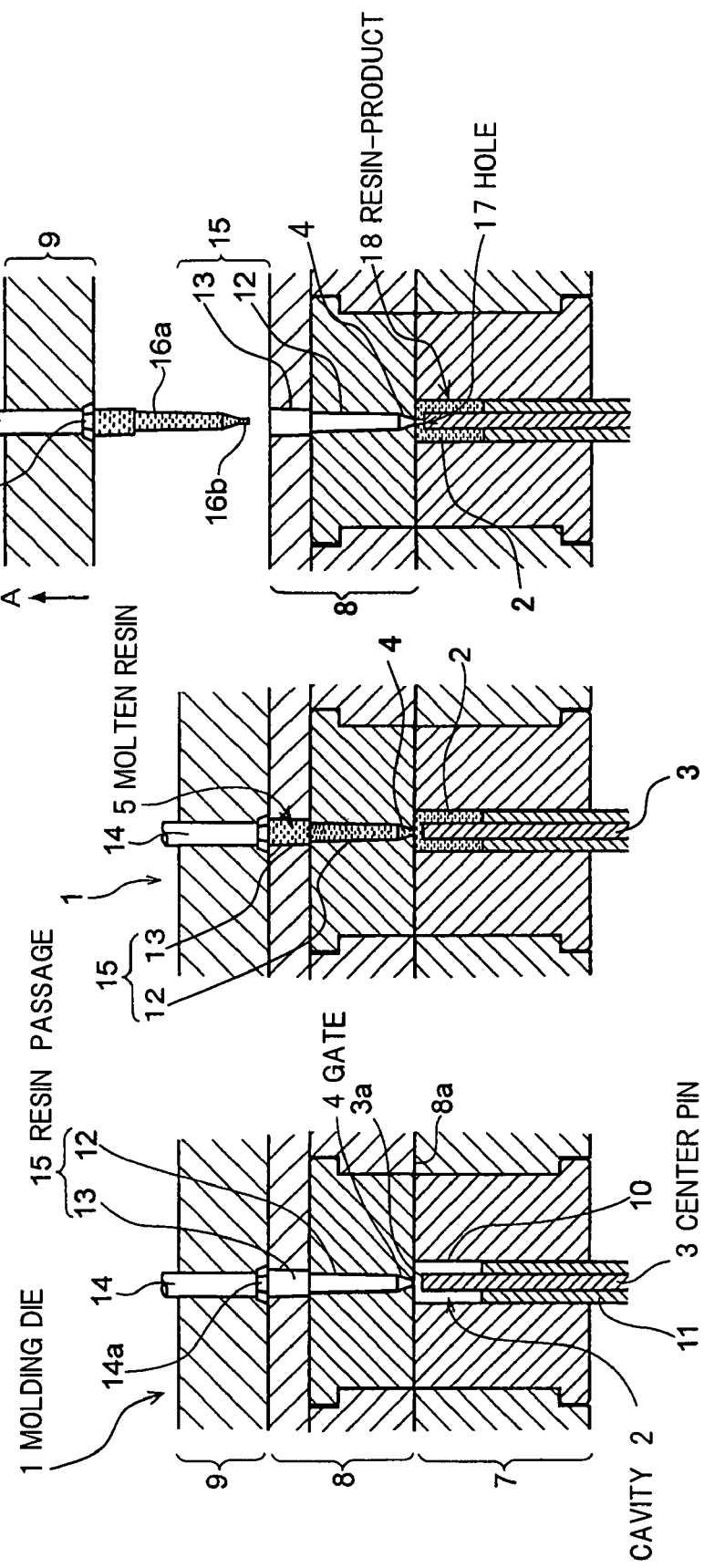

METHOD FOR MOLDING RESIN-PRODUCT

BACKGROUND OF THE INVENTION

1. Field of the Invention

The present invention relates to a method for molding a resin-product for forming a hole in the bottom portion of a shaft bore extending along a central axis of the resin-product to a predetermined depth in a resin-product. More particularly, the invention relates to a method for molding a resin-product which is able to prevent formation of a weld mark or line on the inner circumferential surface of the shaft bore of the resin-product during the molding and is also able to form, in the bottom of the shaft bore simultaneously with the molding of the resin-product, a hole operable as a relief port of air toward the exterior of the shaft bore.

2. Description of the Related Art

In a conventional resin-product, a shaft bore to be press-fit with a shaft member such as a coupling pin and a rotary shaft along the central axis of the resin-product is often formed as a through-bore. In this case, for example, as shown in FIG. 11, in a cavity 32 formed in a molding die 31 for forming a shape of a resin-product, a center pin 33 having a diameter approximately equal to that of a shaft member stands upright so as to erect in the cavity 32. A side gate 34 is provided on the side surface of the cavity 32 so that molten resin 35 is injected into the cavity 32 from the side, which is orthogonal to the center axis of the center pin 33.

In another molding die, a thin gating for injection (it will be hereinafter referred to as a pin gate) as indicated by reference numeral 37 in FIG. 11 is provided extending in parallel with the center axis of the center pin 33 on the top end of the cavity 32, and the molten resin 35 is injected from the pin gate 37 into a space between the inside surface of the cavity 32 and the outside surface of the center pin 33.

In FIG. 11, the molten resin 35 injected from the side gate 34 collides against the side surface of the center pin 33 as shown in FIG. 12, and branches into two flows of molten resin, and those branched molten resin flow along the center pin 33 as indicated by arrows. The leading ends of the flows of the branched molten resin 35, indicated by arrow heads, merge at a point on the side surface of the center pin 33 which is opposite to the side gate 34. The leading ends of the flows of the molten resin 35 have been cooled and at a low temperature as they flow. Therefore, the molten resin 35 having flowed in two directions and merged do not mix, so that a weld mark or line 36 is formed at the point where those two molten resin flows have met each other to join together. Then, in FIG. 11, the upper member of the molding die 31 is opened, and a sleeve pin 38 disposed around the center pin 33 is pushed up. As a result, a resin-product having a through-bore extending along the center axis thereof is extruded out of the molding die.

Also in the case where the molten resin 35 is injected from the pin gate 37 in place of the side gate 34 in FIG. 11, the molten resin 35 flows along the center pin 33 in opposite directions, in a similar state as shown in FIG. 12, meet on the side surface of the center pin 33 at the point which is opposite to the pin gate 37, and a weld mark 36 is formed at the point where those two molten resin flows meet each other.

In the case where a shaft member is inserted into the shaft bore of the resin-product having the weld mark 36 formed on the inner circumferential surface of the shaft bore, strength of the resin-product is sometimes reduced at the portion where the weld mark 36 is formed. In an extreme case, the resin-product will crack at the portion of the weld mark 36. In the case where a rotary body is manufactured with the resin-product, the portion of the weld mark 36 may provide a stepped part. The rotary body loses its weight balance and its stability of rotation.

One way to prevent the formation of such a weld mark 36 is that as shown in FIG. 13, a top end face 33a of the center pin 33 is located in front of a top end 32a of the cavity 32 to thereby provide a predetermined distance from each other, and the pin gate 37 is provided on the top end 32a of the cavity 32 on the extension line of the center axis of the center pin 33. With such a structure, as shown in FIG. 14, the molten resin 35 injected from the pin gate 37 collides against the top end face 33a of the center pin 33 and radially spreads as indicated by arrows. Then, as shown in FIG. 13, the molten resin uniformly flows around the center pin 33 and toward a rear end part 33b of the center pin 33 within the cavity 32. Accordingly, in this case, the arrow-headed leading ends of the flows of the molten resin 35 do not merge with each other, and thus no mark of merging like the above-mentioned weld mark 36 is formed. Subsequently, in FIG. 13, the upper member of the molding die 31 is opened, and the sleeve pin 38 disposed around the center pin 33 is thrust up, whereby a resin-product having an axially extending blind bore having a predetermined depth formed along the center axis thereof is extruded from the molding die.

However, this approach has the following problem. The shaft bore that is formed in the resin-product in order to be press-fit with the shaft member takes a shape of a bottomed blind bore. When the shaft member is press fit into the bottomed blind bore, the air confined in the bottomed blind bore cannot escape from there and is in turn compressed. As a result, the press-fitting of the shaft member is hindered and cannot be completed.

To cope with the problem, there has been a proposal that an axially lengthened bottomed bore having a predetermined depth is produced in the resin-product to allow the shaft member to be completely press fit in the bottomed bore while leaving a cavity portion between the shaft end and the bottom of the bottomed bore and, in addition, an opening or aperture is formed in the bottom of the axially lengthened bottomed bore (Japanese Unexamined Patent Publication No. 2002-268513). With such a structure, when the shaft member is press-fit into the bottomed bore, the air in the bottomed bore is permitted to be relieved from there through the opening, so that the air is prevented from being compressed within the bottomed bore and from applying any pressing force to the shaft-member in a direction in which the shaft-member is drawn out of the bottomed bore.

In such a conventional resin-product, to prevent the formation of the weld mark on the inner circumferential surface of the shaft bore formed extending along the center axis of the resin-product and to form the hole in the bottom portion of the shaft bore, it is necessary to take the following measure. As shown in FIG. 13, the pin gate 37 is provided on the top end 32a of the cavity 32 on the extension line of the center axis of the center pin 33. The molten resin 35 is injected from the pin gate 37 into the cavity 32 and solidified. Thereafter, the pin gate 37 filled with resin is removed and thus, the molding of a resin-product is completed. Subsequently, as described in the above-mentioned patent document, an opening is produced in the bottom of the shaft bore of the resin-product by post-working. In this case, the opening production by the post-working step is added resulting in an increase in the number of product manufacturing process steps, and an increase in the manufacturing cost for the resin-product must be invited.

SUMMARY OF THE INVENTION

Accordingly, an object of the present invention is to provide a method for molding a resin-product which prevents formation of a weld mark on the inner circumferential surface of the shaft bore formed along the center axis of the resin-product and forms an air-relievable hole in the bottom of the shaft bore simultaneously with the molding of the resin-product.

In order to achieve the above-described object, a method for molding a resin-product according to the present invention comprising the steps of: preparing a molding die, the molding die having a die cavity capable of defining a shape of the resin-product provided with a shaft bore axially extending along the central axis of the resin-product to a predetermined depth and with a bottom portion at one end thereof, a bar-like or a rod-like member having an axis thereof and disposed in the die cavity, a resin flow runner formed outside the die cavity so as to extend toward the die cavity on an extension line of the axis of the bar-like member, a gate sprue in continuation with a terminal end of the resin flow runner, and a gate in continuation to the gate sprue, which is formed to fluidly communicate with the die cavity and to inject molten resin supplied from the resin flow runner into the die cavity, the gate having a diameter thereof smaller than that of the gate sprue, the bar-like member being located within the die cavity such that a length of distance from a top end face of the bar-like member to the gate is smaller than an extent of the gate diameter; solidifying the molten resin upon being injected from the gate into the die cavity through the resin flow runner; and forming a hole in the bottom of the shaft bore in the resin-product upon tearing off the resin, which is solidified in the resin flow runner the gate sprue and the gate, in the vicinity of the gate, and also tearing off a resin portion of a resin-product member which connects to the gate when the resin portion is solidified the die cavity together with the resin-product member.

With such an arrangement, a molding die is used in which a die cavity for defining and forming a shape of a resin-product having a shaft bore axially extending along the central axis thereof to a predetermined depth and having a bottom at one end thereof is formed, a bar-like or a rod-like member for forming the shaft bore is disposed in the cavity, a gate for injecting molten resin into the cavity is formed continuously to the cavity, the diameter of the gate is selected to be smaller in size than that of the gate sprue, and the bar-like member is located within the cavity such that a length of distance from the top end face of the bar-like member to the gate is smaller than an extent of the gate diameter. The molten resin is injected from the gate into the die cavity through the resin flow runner and solidified therein, and when the resin which is solidified in the resin flow runner and the gate is torn off in the vicinity of the gate, the resin of the portion connecting to the gate in the resin-product material solidified in the die cavity is also torn off, thereby forming the hole in the bottom of the shaft bore in the resin-product which hole is operable as an air relief port. Since the molten resin is injected into the cavity from the top end face of the bar-like member for forming the shaft bore of the resin-product, the molten resin radially spreads on the top end face of the bar-like member, and uniformly flows from the top end of the bar-like member to the rear end thereof in the cavity. Accordingly, in this case, the leading ends of the flows of the molten resin do not merge with each other, and thus no weld mark is formed. As a result, a resin-product having the shaft bore with high strength is manufactured. In addition, the hole is formed in the bottom of the shaft bore simultaneously with the molding of the resin-product, thereby providing easy manufacture of the resin-product. The gate for injecting the molten resin into the cavity and the position where the hole is formed in the resin-product are located on the same end face of the resin-product. Therefore, the present invention may be applied to the resin-product of which the end face is small.

Further, it is preferable that the top end face of the bar-like member disposed within the cavity is placed opposite and close to the end face of the cavity at the gate side, and a value of a thickness of the bottom of the shaft bore in the resin-product member solidified in the cavity is smaller than that of the gate diameter. With this structure, a thickness value of the bottom of the resin-product member solidified in the cavity is smaller than that of the gate diameter right under the gate. By stress concentration when the resin which is solidified in the resin flow runner and the gate is torn off in the vicinity of the gate, the resin of the portion connecting to the gate is also torn off, thereby forming the hole in the bottom of the shaft bore in the resin-product. In addition, the value of the thickness of the bottom of the shaft bore of the resin-product member solidified in the cavity is smaller than that of the gate diameter right under the gate. Therefore, the amount of resin material required for manufacturing the resin-product is reduced, leading to a reduction in the manufacturing cost.

Further, a protruded part having a width substantially equal to the gate diameter may be provided on the top end face of the bar-like member disposed within the cavity, while being placed opposite to the gate. With this structural feature, a value of a thickness of the bottom of the shaft bore of the resin-product member solidified in the cavity is further smaller than that of the gate diameter right under the gate. By stress concentration when the resin which is solidified in the resin flow runner and the gate is torn off in the vicinity of the gate, the resin of the portion connecting to the gate is also easily torn off, thereby forming the hole in the bottom portion of the shaft bore in the resin-product. Stress may be concentrated at the corners of the resin-product member, which correspond to the edge of the protruded part of the top end face of the bar-like member. If so done, crack will more easily occur in this portion. Accordingly, the hole is more reliably formed. In addition, since the protruded part is provided on the top end face of the bar-like member disposed in the cavity, the value of a thickness of the bottom of the shaft bore of the resin-product member solidified in the cavity is smaller than that of the gate diameter right under the gate. Accordingly, the required amount of the resin material is reduced, leading to a reduction in the manufacturing cost.

Furthermore, the protruded part on the top end face of the bar-like member may be tapered in cross section. With this feature, as in the state as mentioned above, the resin of the portion connecting to the gate is also easily torn off, thereby forming the hole in the bottom portion of the shaft bore in the resin-product.

A cut-out groove or a notch having a predetermined depth may be formed in a portion of the resin-product where the resin-product member solidified in the cavity connects to the gate, and formed toward the inside of the cavity and around the gate. With the presence of the cut-out groove formed around the gate in resin-product member solidified in the cavity and by stress concentration when the resin which is solidified in the resin flow runner and the gate is torn off in the vicinity of the gate, cracks occur at the tip of the cut-out groove in the thickness direction and the portion connecting to the gate is also torn off to form a hole in the bottom of the shaft bore of the resin-product.

Additionally, a cut-out groove having a predetermined depth, which ranges from the bottom of the shaft bore of the resin-product to the gate, may be formed in a portion of the resin-product which still remains so as to connect the resin-product member solidified in the cavity with the gate of the molding die and is substantially dimensioned so as to correspond to the diameter of the gate. With the presence of the cut-out groove having a predetermined depth, which is formed in a portion of the resin-product member solidified in the cavity of which the dimension substantially corresponds to the diameter of the gate and by stress concentration when the resin which remains solidified in the resin flow runner and the gate is torn off in the vicinity of the gate, cracks occur at the tip of the cut-out groove in the thickness direction and the portion of the solidified resin connecting to the gate is also torn off to form a hole in the bottom of the shaft bore of the resin-product.

The outside diameter of the top end of the bar-like member disposed within the cavity may be selected to be smaller in size than the diameter of the gate, and the top end of the bar-like member is located close to and in alignment with the center of the gate. With this structural feature, the cross sectional portion smaller than the gate diameter is formed in the vicinity of the gate connecting to the resin solidified in the cavity. Hence, by stress concentration when the resin which is solidified in the resin flow runner and the gate is torn off in the vicinity of the gate, the resin of the portion connecting to the gate is also torn off to form a hole in the bottom of the shaft bore of the resin-product.

BRIEF DESCRIPTION OF THE DRAWINGS

FIGS. 1A through 1C are central longitudinal sectional views showing the first half of a molding process of a method for molding a resin-product according to an embodiment of the present invention;

DESCRIPTION OF THE PREFERRED EMBODIMENTS

Embodiments of the present invention will be described in detail with reference to the accompanying drawings.

Figure 2A:
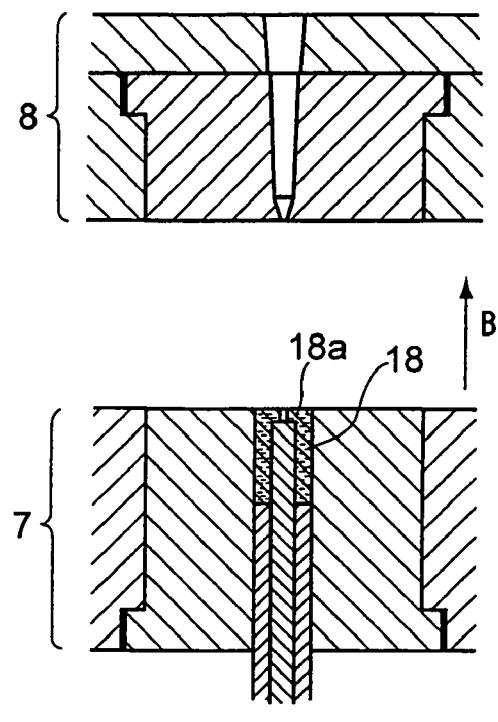
FIGS. 2A and 2B are central longitudinal sectional views showing the second half of the molding process of the method for molding the resin-product according to the embodiment of the present invention.
Figure 2B:
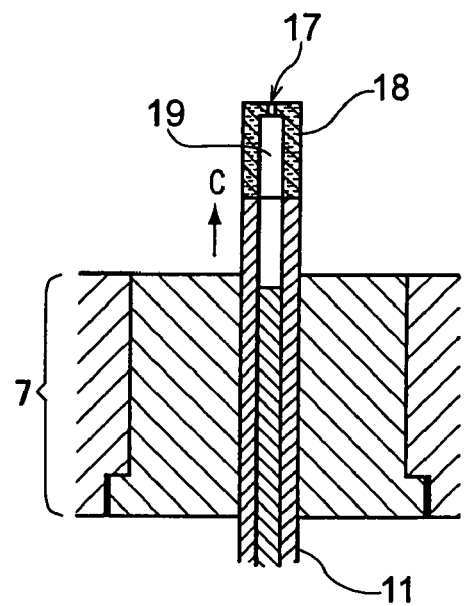

FIGS. 1 and 2 are views showing procedural steps of a method for molding a resin-product according to an embodiment of the present invention. FIGS. 1A through 1C are central longitudinal sectional views showing the first half of the molding process, and FIGS. 2A and 2B are central longitudinal sectional views showing the second half of the molding process. The method for molding the resin-product is presented for forming a hole in a bottom portion formed in one of the ends of a shaft bore which extends along the central axis of the resin-product to a predetermined depth in a resin-product. The method for molding the resin-product molding method includes: a molten-resin injecting/solidifying step; a gate cutting step; and a product take-out step. An injection molding of a cylindrical resin-product, by way of example, will be described in order of the molding process steps.

To start with, a molding die 1 having formed therein a cavity 2 for forming a shape of a resin-product as shown in FIG. 1A is placed at a predetermined position in an injection molding apparatus, not shown. The molding die 1 forms a resin-product by filling the cavity 2 with molten resin 5. A bar-like member for forming the shaft bore is placed in the cavity 2. A resin flow passage extending toward the cavity 2 on the extension line of the bar-like member, which extends in the axial direction, is formed outside the cavity 2. A gate sprue and a gate which communicates with the cavity 2, for injecting the molten resin 5 into the cavity 2, are continuously formed toward the terminal end of the resin passage. The diameter of the gate is selected to be smaller in size than that of the gate sprue. The bar-like member is located within the cavity 2 such that a value of a distance from the top end face of the bar-like member to the gate is smaller than that of the gate diameter. Specifically, as shown in FIG. 1A, the molding die includes a first plate 7, a second plate 8 and a third plate 9.

Figure 3:
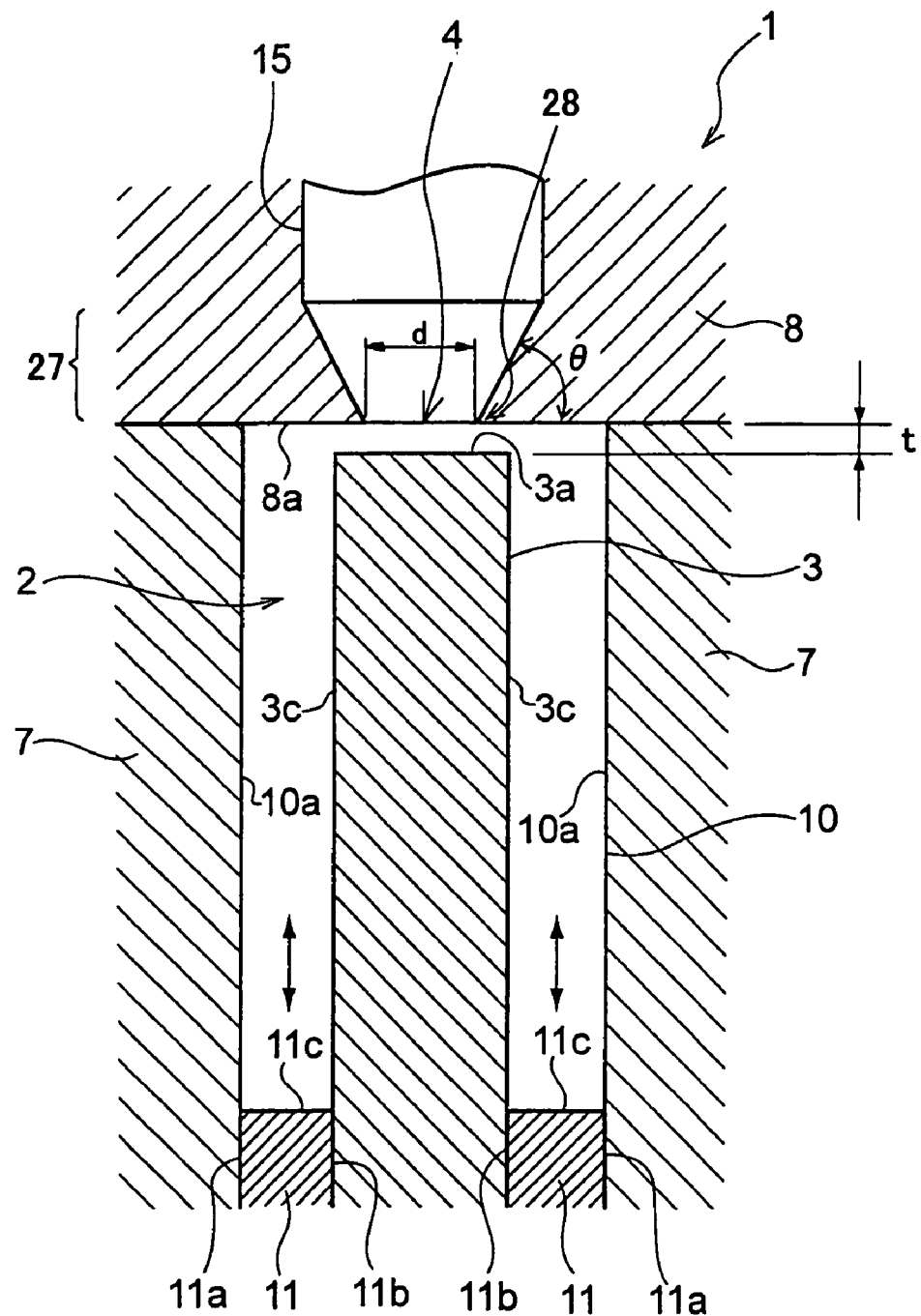
FIG. 3 is an enlarged central longitudinal sectional view showing a cavity of a molding die used in the embodiment of the invention.

The first plate 7 forms the cavity 2 for defining a shape of a resin-product, in combination with the second plate 8 to be described later. As shown in FIG. 3, a cylindrical hole 10 having the same inner circumferential surface as the outer configuration of the resin-product is vertically formed at the central part of the first plate and fastened to an injection molding apparatus. A circular bar-like center pin 3 is located at the central part of the cylindrical hole 10 formed in the first plate 7. The center pin 3 is a bar-like member used for forming a shaft bore having a predetermined depth, which is to be press fit with a shaft member such as a rotary shaft, in the resin-product. A top end face 3a of the center pin is located close to a lower end surface 8a of the second plate 8. A sleeve pin 11 like a cylindrical tube is located between an inner circumferential surface 10a of the cylindrical hole 10 and an outer circumferential surface 3c of the center pin 3. The sleeve pin 11 is used for extruding a resin-product out of the molding die 1. The sleeve pin 11 is vertically movable as indicated by an arrow in a state that its outer circumferential surface 11a slidably contacts the inner circumferential surface 10a of the cylindrical hole 10, and its inner circumferential surface 11b slidably contacts the outer circumferential surface 3c of the center pin 3. As a result, a space is formed which is defined by the inner circumferential surface 10a of the cylindrical hole 10, the outer circumferential surface 3c and the top end face 3a of the center pin 3, the upper end face 11c of the sleeve pin 11, and the lower end surface 8a of the second plate 8. This space serves as the cavity 2 for forming a shape of a resin-product.

The second plate 8, as shown in FIG. 1A, is placed above the first plate 7. The second plate 8 is vertically movable with respect to the first plate 7. A first passage 12 vertically passes through the second plate 8, while substantially coaxially aligning with the center axis of the center pin 3 located within the cylindrical hole 10 of the first plate 7. A pin gate (hereinbelow, referred to simply as "gate") 4 used for injecting molten resin 5 into the cavity 2 is formed at the lower end part of the first passage 12, while communicating with the cavity 2. Further, a member having a second passage 13 formed therein, which is continuous to the first passage 12, is located on the upper side of the second plate 8 (to be described later). The first passage 12 and the second passage 13 formed in the second plate 8 cooperate to form a resin passage 15 for introducing the molten resin 5 to the cavity 2 formed in the first plate 7.

The third plate 9 is placed above the second plate 8. The third plate 9 is vertically movable with respect to the first plate 7 and/or the second plate 8. A runner lock pin 14 is provided on the upper end side of the second passage 13, which is continuous to the first passage 12 formed in the second plate 8. An undercut part 14a is provided at the lower end of the runner lock pin 14.

In addition, in this structure, as shown in FIG. 3, the top end face 3a of the center pin 3 disposed within the cavity 2 is placed opposite and close to the end face (coincident with the lower end surface 8a of the second plate 8) of the cavity 2, which is closer to the gate 4. A value of a thickness "t" of a bottom portion of the shaft bore in the resin-product material solidified within the cavity 2 is selected to be smaller than that of a gate diameter "d" continuous from the gate 4 to the cavity 2. In this instance, the gate diameter "d" is about 2 mm, and the thickness "t" of the bottom portion of the shaft bore is about 0.5 mm. In FIG. 3, the side wall of an injection port of the gate 4 to the cavity 2 is slanted at an angle θ (for example, about 60°) with respect to the lower end surface 8a of the second plate 8. The injection port to the cavity 2 is tapered toward its tip. Here, the gate 4 is an area of a circular hole of the diameter "d". An injection port to the cavity 2, of which the side wall is slanted at the angle θ and the cross section is trapezoidal in shape, is called a gate sprue (indicated by reference numeral 27). In this case, the gate diameter "d" of the gate 4 is selected to be smaller than a trapezoidal large diameter part of the gate sprue 27.

Figure 11:
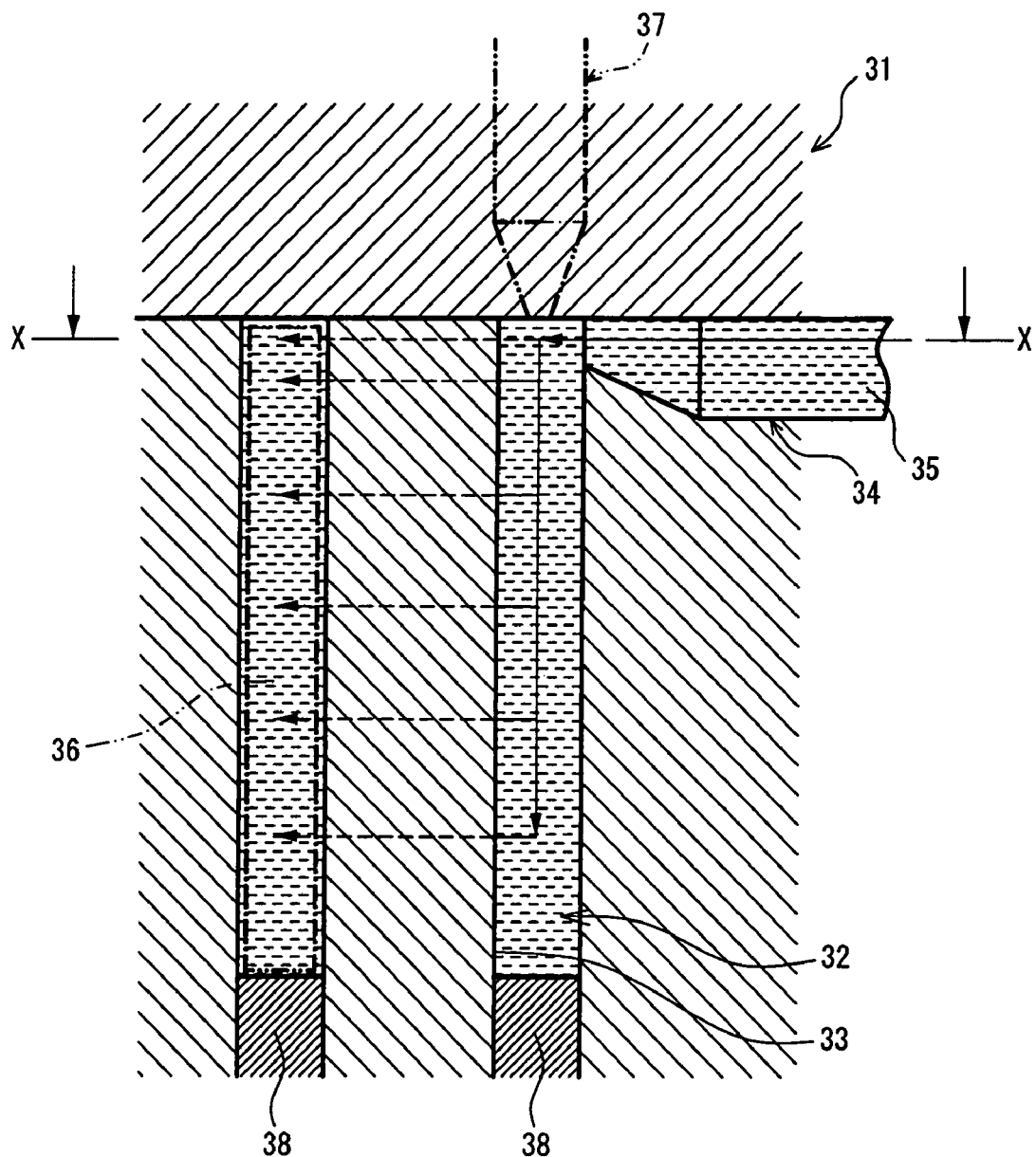
FIG. 11 is a central longitudinal sectional view for explaining the fact that when a gate is provided on the side surface of the cavity, a weld mark is formed in the inner circumferential surface of the shaft bore of the resin-product.
Figure 12:
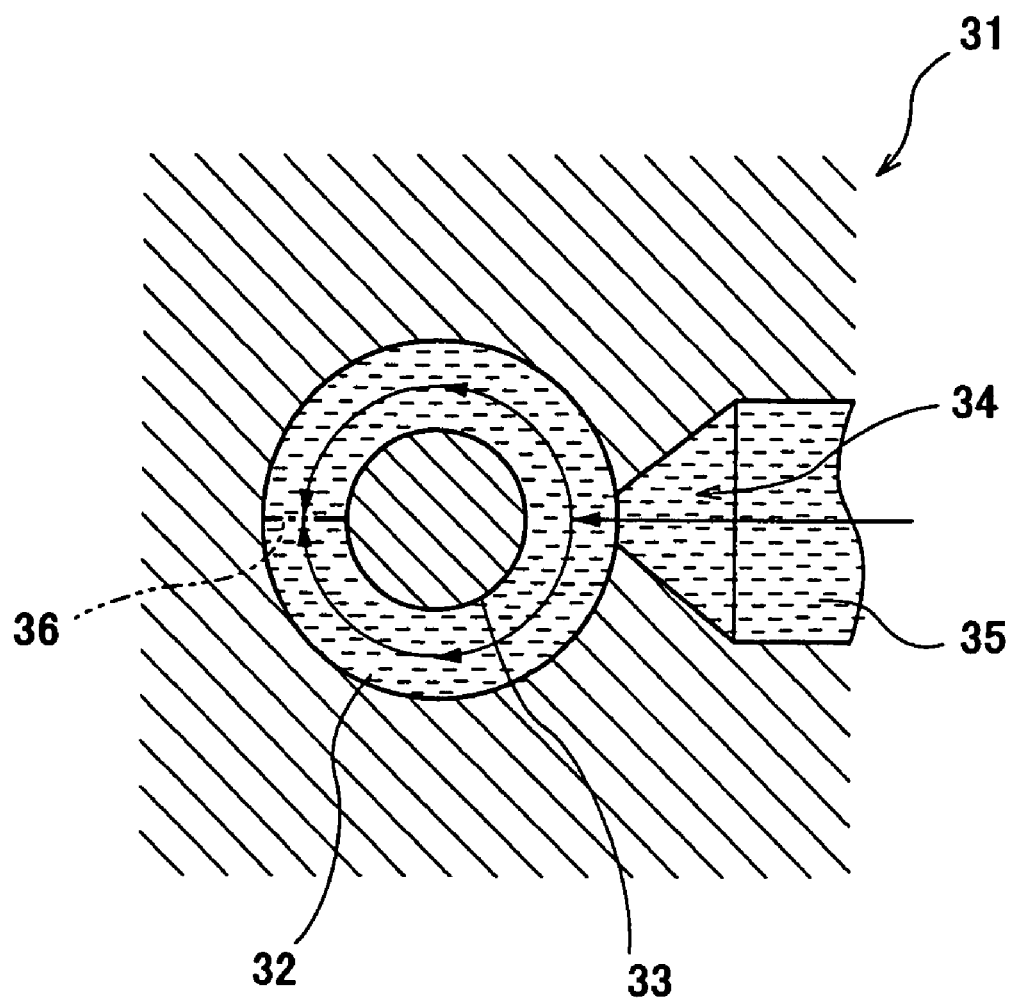
FIG. 12 is a cross-sectional view taken along the line X-X in FIG. 11, the view explaining the fact that when the gate is provided on the side surface of the cavity, the weld mark is formed in the inner circumferential surface of the shaft bore of the resin-product.
Figure 13:
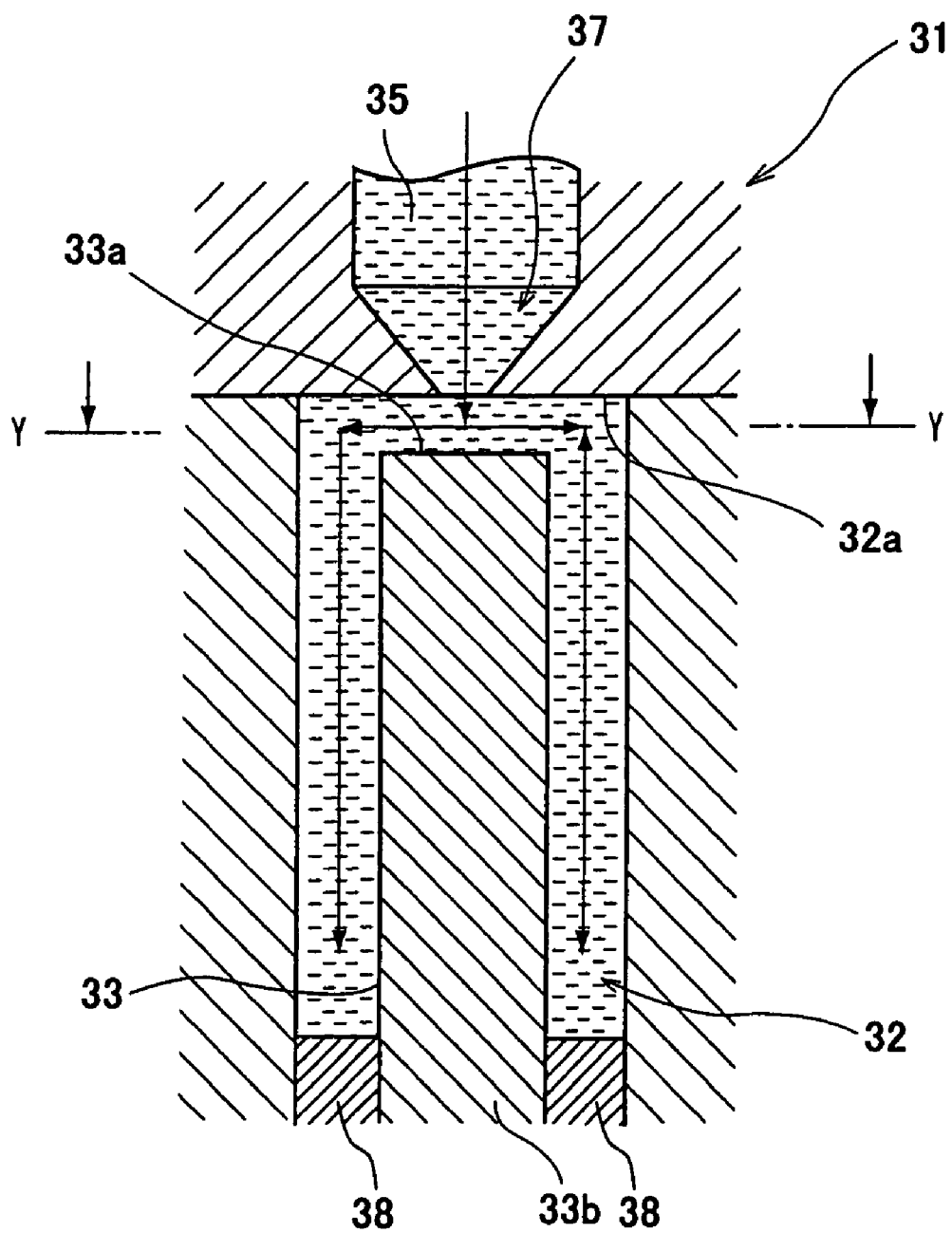
FIG. 13 is a central longitudinal sectional view for explaining the flows of molten resin when a gate is provided on the top end of the cavity on the extension line of the center axis of the center pin.
Figure 14:
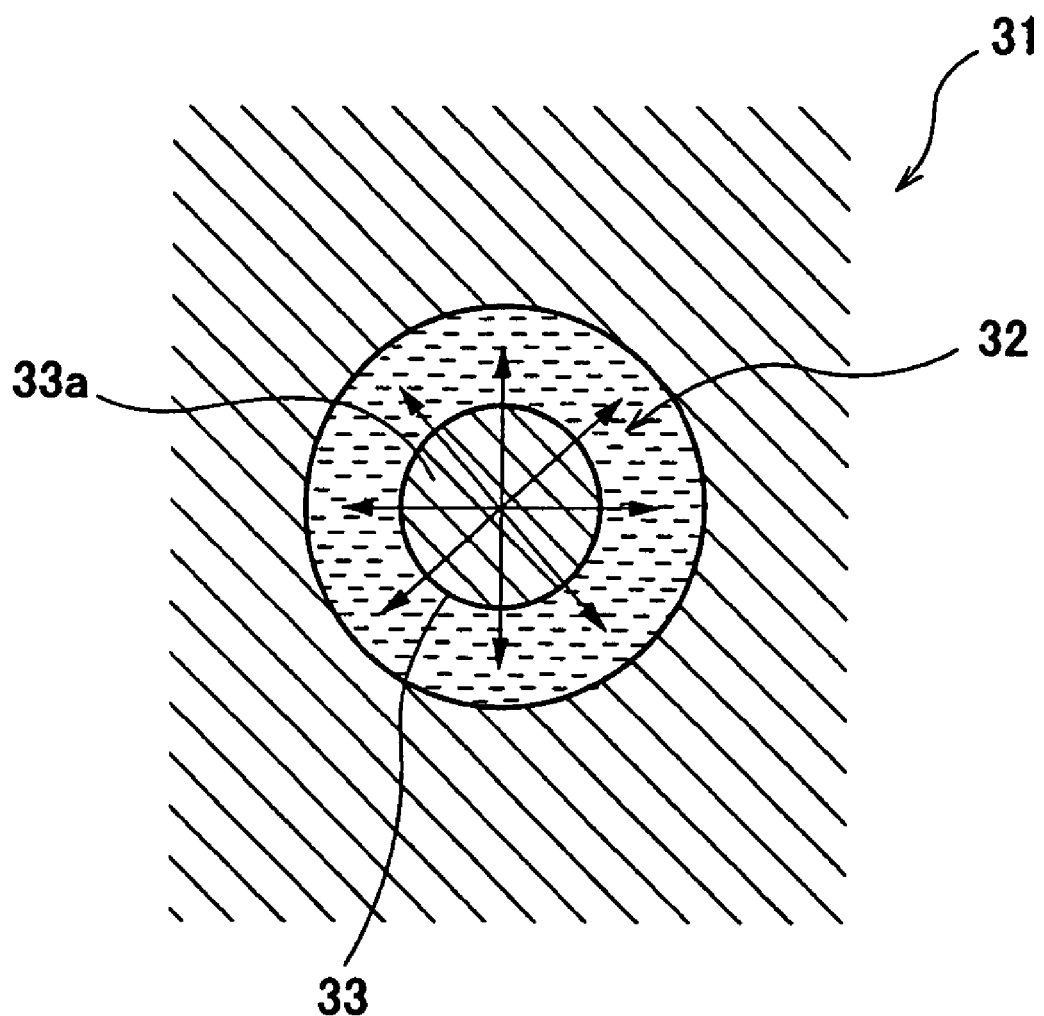
FIG. 14 is a cross sectional view taken along the line Y-Y in FIG. 13, the view explaining the flows of molten resin when the gate is provided on the top end of the cavity on the extension line of the center axis of the center pin.

In a molten-resin injecting/solidifying step shown in FIG. 1B, the molten resin 5 supplied from the injection molding apparatus is first injected through the resin passage 15 formed in the molding die 1, from the gate 4 at the terminal end of the resin passage 15, into the cavity 2 of the molding die 1. In this case, the gate 4 is provided while substantially aligning with and on the extension of the center axis of the center pin 3 placed within the cylindrical hole 10 of the first plate 7. With this structural feature, the injected molten resin 5, as similarly indicated in the case of FIG. 13, collides against the top end face 3a of the center pin 3 to radially spread. Then, the molten resin uniformly flows, in the cavity 2, around the center pin 3 and toward the rear end 3b of the center pin 3. Accordingly, there is no chance that the leading ends of the arrow-headed flows of the molten resin 5 merge with each other, and hence, no weld mark 36 as shown in FIG. 11 is formed.

In addition, when the cavity 2 formed in the molding die 1 is sufficiently filled with the molten resin 5, inject of the molten resin 5 is stopped, and the resin is cooled and solidified.

In a gate cutting step shown in FIG. 1C, when the resin is satisfactorily solidified, the third plate 9 is opened upward as indicated by an arrow A. In this case, the undercut part 14a is provided at the lower end of the runner lock pin 14, which is disposed close to the upper end of the second passage 13 formed in the second plate 8. Accordingly, a resin 16a solidified within the resin passage 15 is firmly put on the undercut part 14a. Therefore, when the third plate 9 is opened in the direction of the arrow A, the solidified resin 16a solidified within the resin passage 15 is torn off from the resin solidified within the cavity 2, at the injection port of the pin gate 4 of the second plate 8, and pulled out of the resin passage 15.

Figure 4:
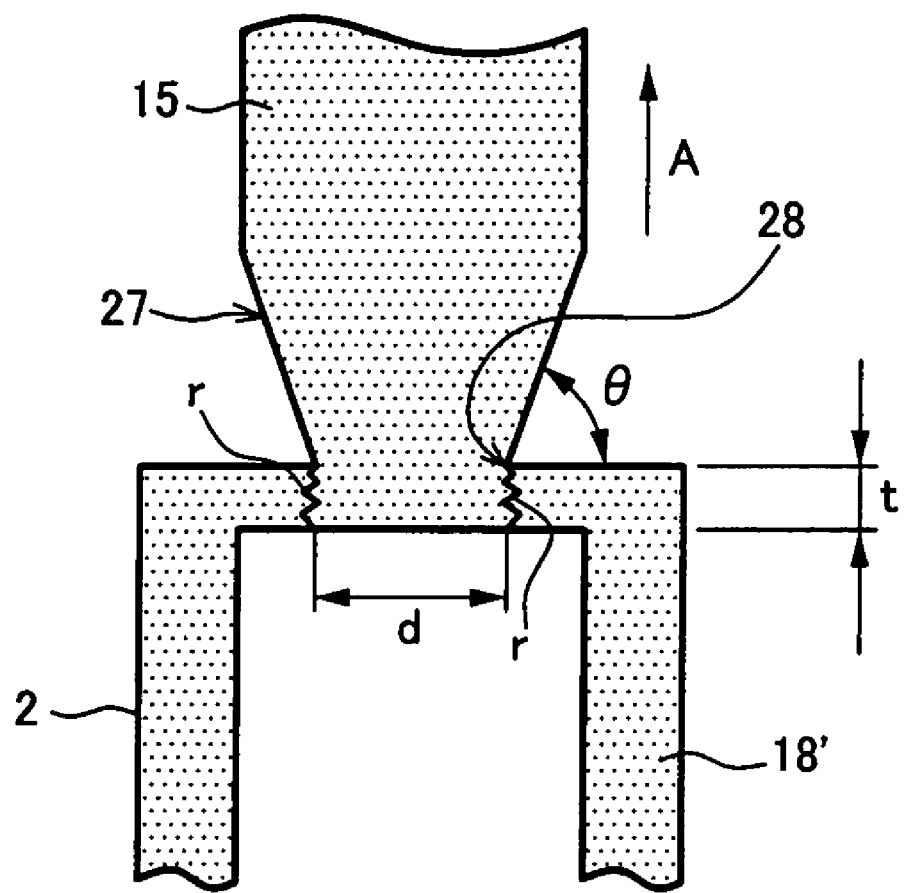
FIG. 4 is a cross sectional view showing a key portion of the molding die when a molten resin injected into a cavity formed in the molding die is solidified in a molten resin injecting/solidifying step shown in FIG. 1B.
Figure 5:
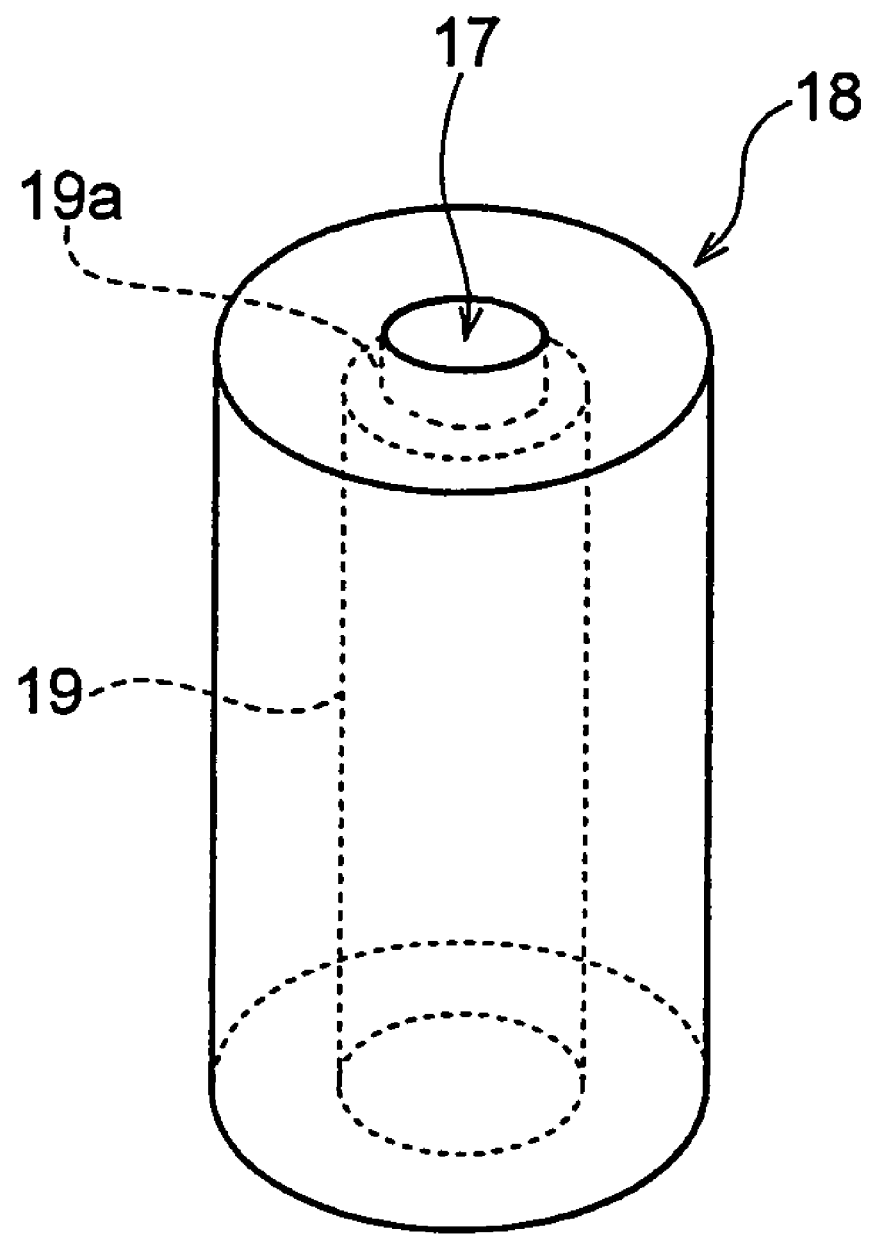
FIG. 5 is a perspective view showing a resin-product in which a hole is formed in the bottom portion of a shaft bore having a predetermined depth.

FIG. 4 shows a key portion of the molding die 1 when the molten resin 5 injected into the cavity 2 formed in the molding die 1 is solidified in the molten resin injecting/solidifying step shown in FIG. 1B. FIG. 4 enlargedly shows a portion of the gate sprue 27 and therearound, which is filled with a resin-product material 18' which has been injected from the gate 4 shown in FIG. 3 into the cavity 2 and solidified. In this case, the value of the thickness "t" of the bottom portion of the shaft bore in the resin-product material 18' solidified within the cavity 2 is selected to be smaller than that of the diameter "d" of the gate 4 (about ¼, for example). Therefore, when an upward force as indicated by an arrow A in FIG. 4 is applied to the resin solidified in the gate 4, stress concentrates at a lower end corner 28 which is most reduced in diameter in the gate sprue 27. Consequently, cracks "r" occur at the lower end corner 28 in the direction of the thickness "t", and a portion 16b connecting to the gate 4 (see FIG. 1C) is also torn off. As a result, as shown in FIG. 5, a hole 17 is formed in a bottom portion 19a of a shaft bore 19 of a resin-product 18.

The molding process proceeds to the product take-out step shown FIG. 2. As shown in FIG. 2A, the second plate 8 is opened in the direction of an arrow B from the first plate 7 to expose the end portion 18a of the resin-product 18. Then, the sleeve pin 11 shown in FIG. 2B is thrust upward as indicated by an arrow C to extrude the resin-product 18 out of the first plate 7. In this way, as shown in FIG. 5, the resin-product 18 is completed which has the hole 17 in the bottom portion 19a of the shaft bore 19 formed along the central axis of the resin-product to have a predetermined depth. Thus, the hole 17 is formed in the bottom portion of the shaft bore 19 simultaneously with the molding of the resin-product 18, thereby enabling easy manufacturing of the resin-product 18.

Figure 6:
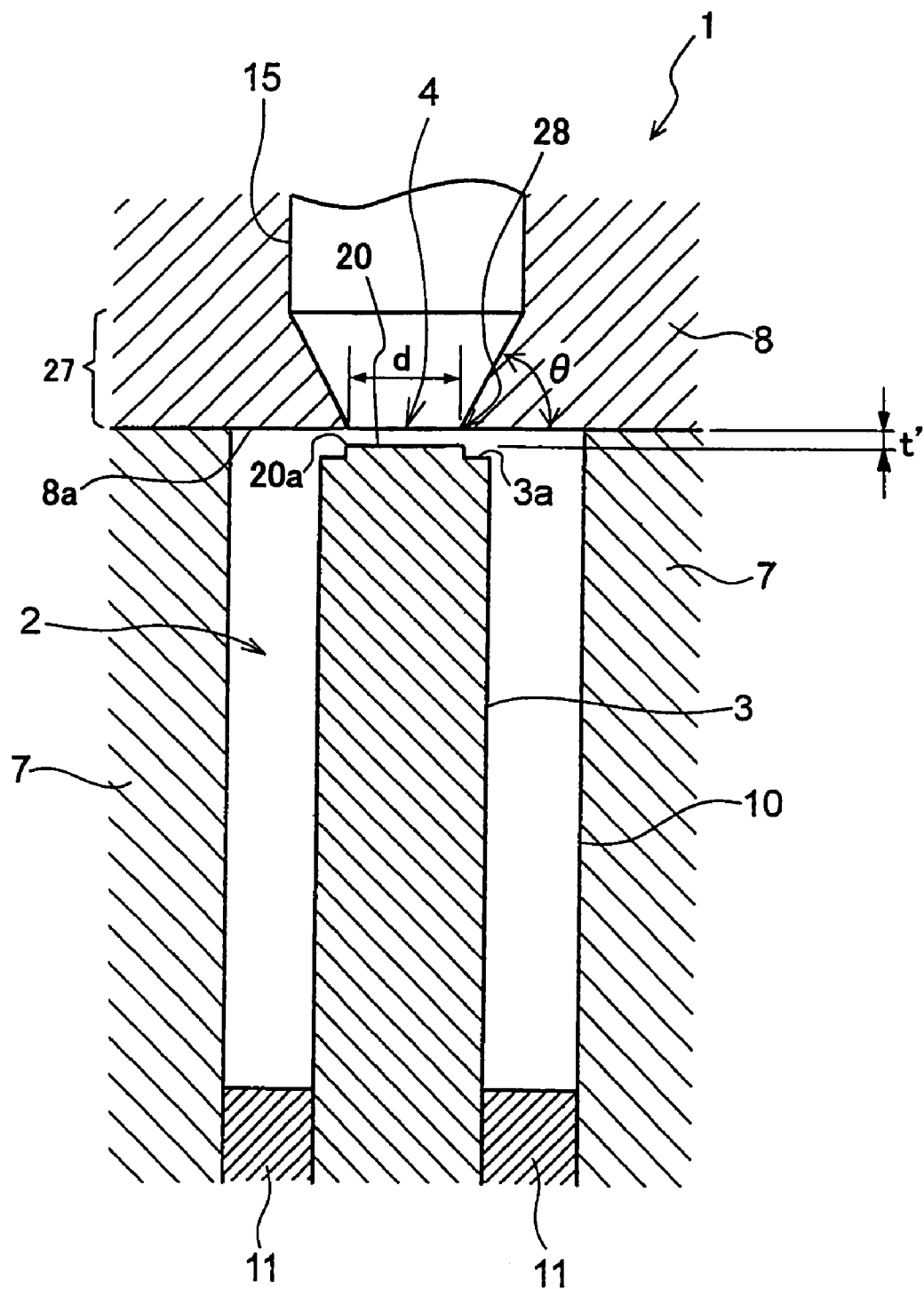
FIG. 6 is a central longitudinal sectional view showing a first modification of the cavity of the molding die.

FIG. 6 is a central longitudinal sectional view showing a first modification of the cavity 2 of the molding die 1. In the modification, to form the cavity 2, a protruded portion 20 having a width substantially equal to the gate diameter "d" is provided on the top end face 3a of the center pin 3 disposed within the cavity 2, and is placed opposite to the gate 4. With this structure, a thickness "t"' of the bottom portion 19a (see FIG. 5) of the resin-product material 18' solidified in the cavity 2 is further reduced when compared to the gate diameter "d" right under the injection port of the gate 4. When the resin which is solidified in the resin passage 15 and the gate 4 is torn off at the injection port of the gate 4, stress concentrates at the lower end corner 28 reduced in diameter in the gate sprue 27 and hence, the resin of the portion connecting to the gate 4 is also readily torn off, so that the hole 17 is formed in the bottom portion 19*a* of the shaft bore 19 in the resin-product 18. Stress may be concentrated at the corners of the resin-product material 18', which correspond to an edge 20*a* of the protruded part 20 of the top end face 3*a* of the center pin 3. If so done, crack will more easily occur in a portion ranging from the lower end corner 28 to the edge 20*a*. Accordingly, the hole 17 as shown in FIG. 5 is reliably formed.

Figure 7:
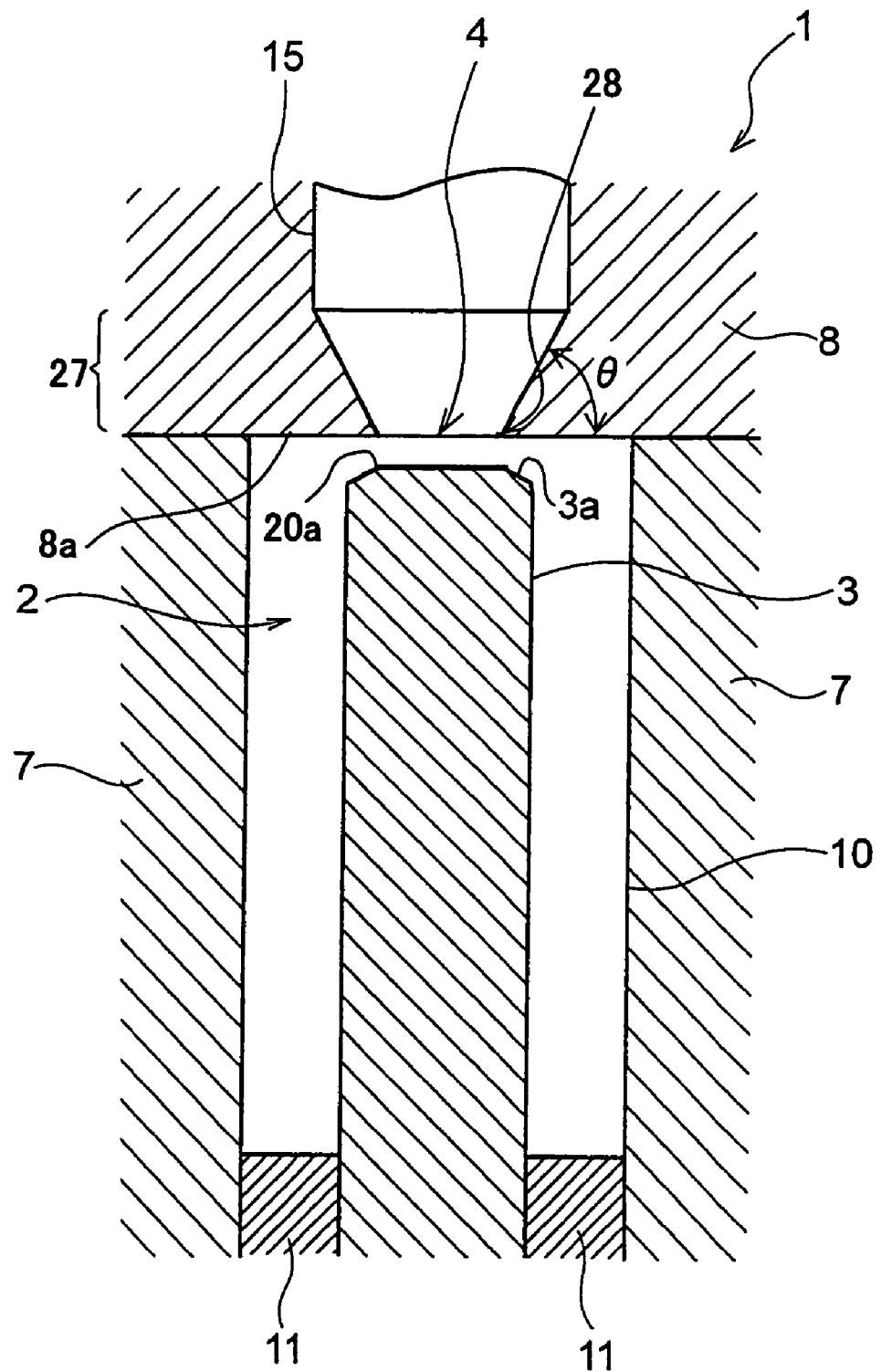
FIG. 7 is a central longitudinal sectional view showing a second modification of the cavity of the molding die.

FIG. 7 is a central longitudinal sectional view showing a second modification of the cavity 2 of the molding die 1. In this modification, to form the cavity 2, the protruded part 20 on the top end face 3*a* of the center pin 3 shown in FIG. 6 is tapered in cross section. Also in this case, as similarly indicated in FIG. 6, when the resin which is solidified in the resin passage 15 and the gate 4 is torn off at the injection port of the gate 4, stress concentrates at the lower end corner 28 reduced in diameter in the gate sprue 27 and hence, the resin of the portion connecting to the gate 4 is also readily torn off, thereby forming the hole 17 in the bottom portion 19*a* of the shaft bore 19 in the resin-product 18. Stress may be concentrated at the corners of the resin-product material 18', which correspond to the edge 20*a* of the protruded part 20 of the top end face 3*a* of the center pin 3. If so done, crack will more easily occur in a portion between the lower end corner 28 and the edge 20*a*.

Figure 8:
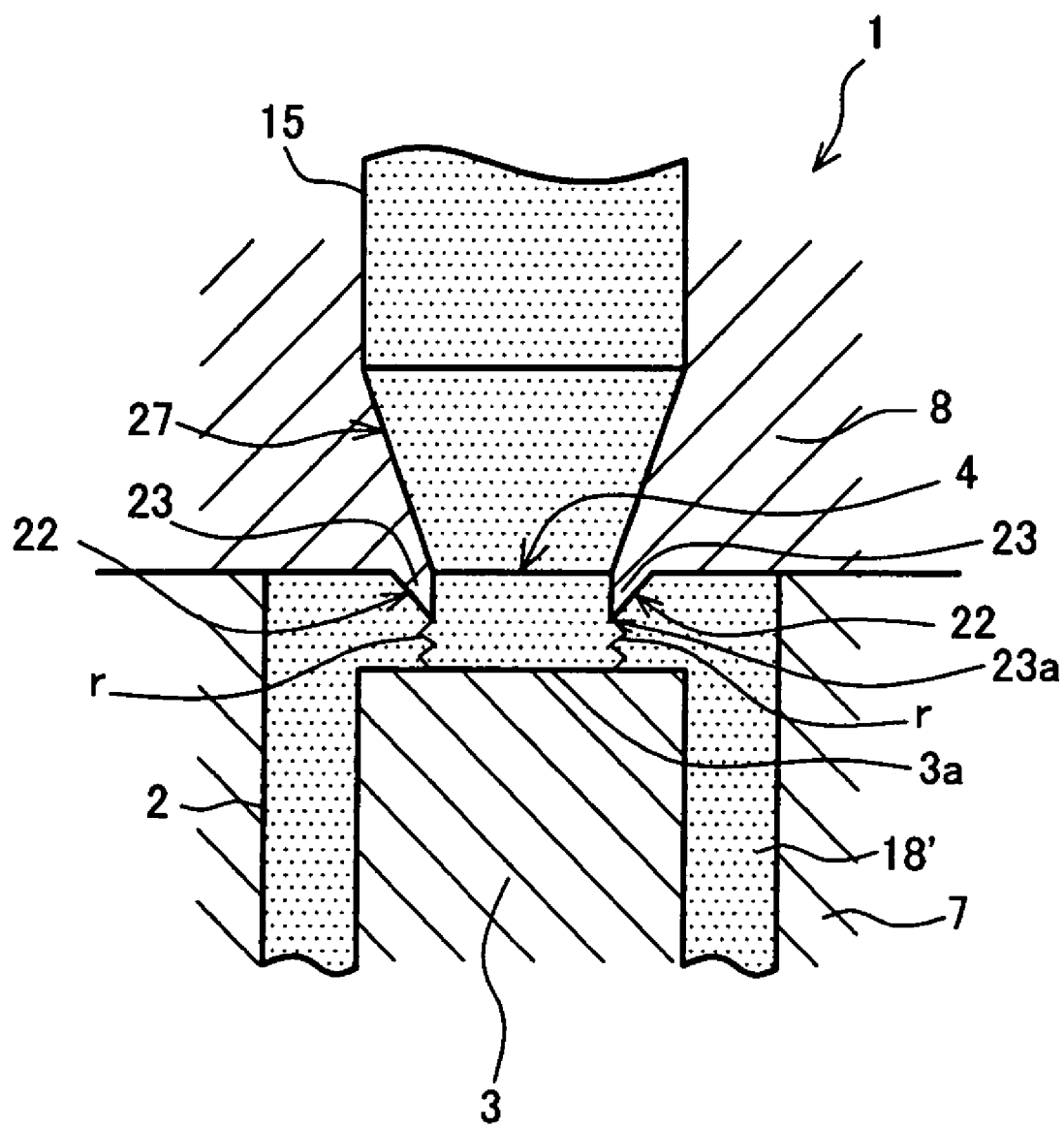
FIG. 8 is a central longitudinal sectional view showing a third modification of the cavity of the molding die.

FIG. 8 is a central longitudinal sectional view showing a third modification of the cavity 2 of the molding die 1. In the modification, to form the cavity 2, a cut-out groove 22 is formed to have a predetermined depth toward the inside of the cavity 2 and around the gate 4 in the resin-product of a portion of the resin-product material 18' solidified in the cavity 2, which the portion connects to the gate 4. In this case, a ring-like protruded part 23 is downwardly protruded in a portion of the second plate 8 of the molding die 1, where the gate 4 is to be formed. The ring-like protruded part 23 is tapered at an angle of, for example, 30° through 80° when viewed in cross section. A tip end 23*a* of the protruded part 23 extends toward the top end face 3*a* of the center pin 3. A length of the distance between the tip end 23*a* of the protruded part 23 and the top end face 3*a* of the center pin 3 is selected to be smaller than an extent of the diameter "d" of the gate 4 (about ¼, for example). With the presence of the protruded part 23, when the molten resin 5 is injected into the cavity 2, a downwardly extending cut-out groove 22 is formed in the resin-product material 18', while being located around the gate 4.

In the modification of FIG. 8, as similarly indicated in the case of FIG. 4, when an upward force is applied to the resin solidified in the gate 4 as indicated by an arrow A, stress concentrates at the tip end 23*a* of the ring-like protruded part 23 which downwardly extends at a position around the gate 4. As a result, cracks "r" occur which extend from the tip end 23*a* of the protruded part 23 to the top end face 3*a* of the center pin 3 in the thickness direction. In addition, the portion 16*b* connecting to the gate 4 (see FIG. 1C) is torn off. As a result, as shown in FIG. 5, a hole 17 is formed in the bottom portion 19*a* of the shaft bore 19 of the resin-product 18.

Figure 9:
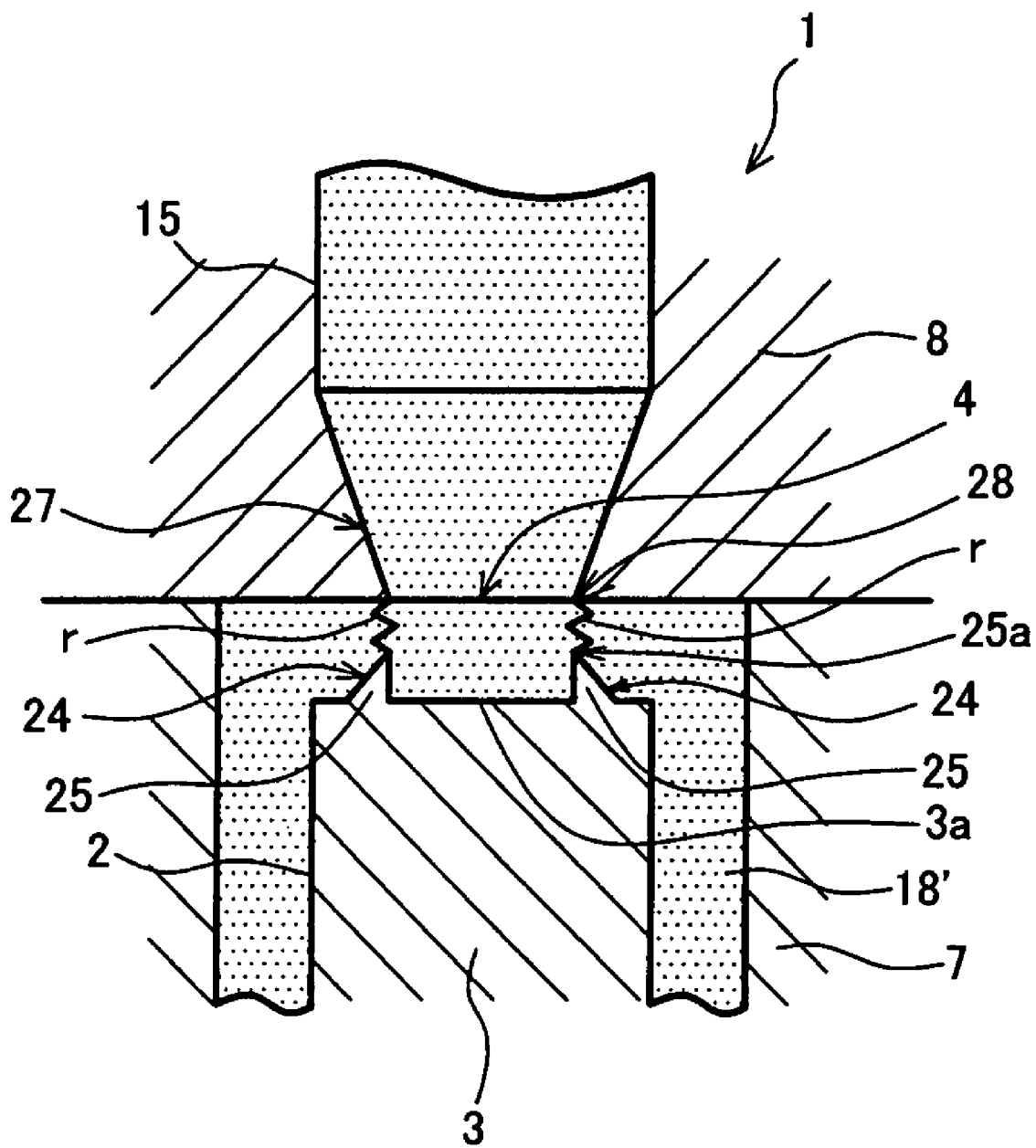
FIG. 9 is a central longitudinal sectional view showing a fourth modification of the cavity of the molding die.

FIG. 9 is a central longitudinal sectional view showing a fourth modification of the cavity 2 of the molding die 1. In the modification, to form the cavity 2, a cut-out groove 24 having a predetermined depth, which ranges from the bottom portion 19*a* of the shaft bore 19 toward the gate 4, is formed in a position corresponding to the gate 4 having the diameter "d" in the portion of the resin-product material 18' solidified in the cavity 2, which portion connects to the gate 4. In this case, a ring-like protruded part 25 is upwardly protruded at position on the top end face 3*a* of the center pin 3, corresponding to a portion around the gate 4. The ring-like protruded part 25 is tapered in cross section at an angle of, for example, from 30° through 80°, and a tip end 25*a* of the ring-like protruded part 25 extends toward the gate 4. A length of a distance between the tip end 25*a* of the protruded part 25 and the gate 4 is selected to be smaller than an extent of the diameter "d" of the gate 4 (about ¼, for example). With the presence of the ring-like protruded part 25, when the molten resin 5 is injected into the cavity 2, a cut-out groove 24 is upwardly formed around the gate 4 in the resin-product material 18' at a side of the top end face 3*a* of the center pin 3.

In the modification of FIG. 9, as similarly indicated in the case of FIG. 4, when an upward force is applied to the resin solidified in the gate 4 as indicated by an arrow A, stress concentrates at the tip end 25*a* of the ring-like protruded part 25 which upwardly extends toward the portion around the gate 4, at the side of the top end face 3*a* of the center pin 3. Then, cracks "r" occur which extend from the tip end 25*a* of the protruded part 25 to the lower end corner 28 of the gate sprue 27 in the thickness direction. In addition, the portion 16*b* connecting to the gate 4 (see FIG. 1C) is also torn off. As a result, as shown in FIG. 5, a hole 17 is formed in the bottom portion 19*a* of the shaft bore 19 of the resin-product 18. The cut-out groove 24 is not limited to the configuration tapered in cross section at the angle of approximately 30° through 80°. For example, it may be an I-shaped configuration.

Figure 10:
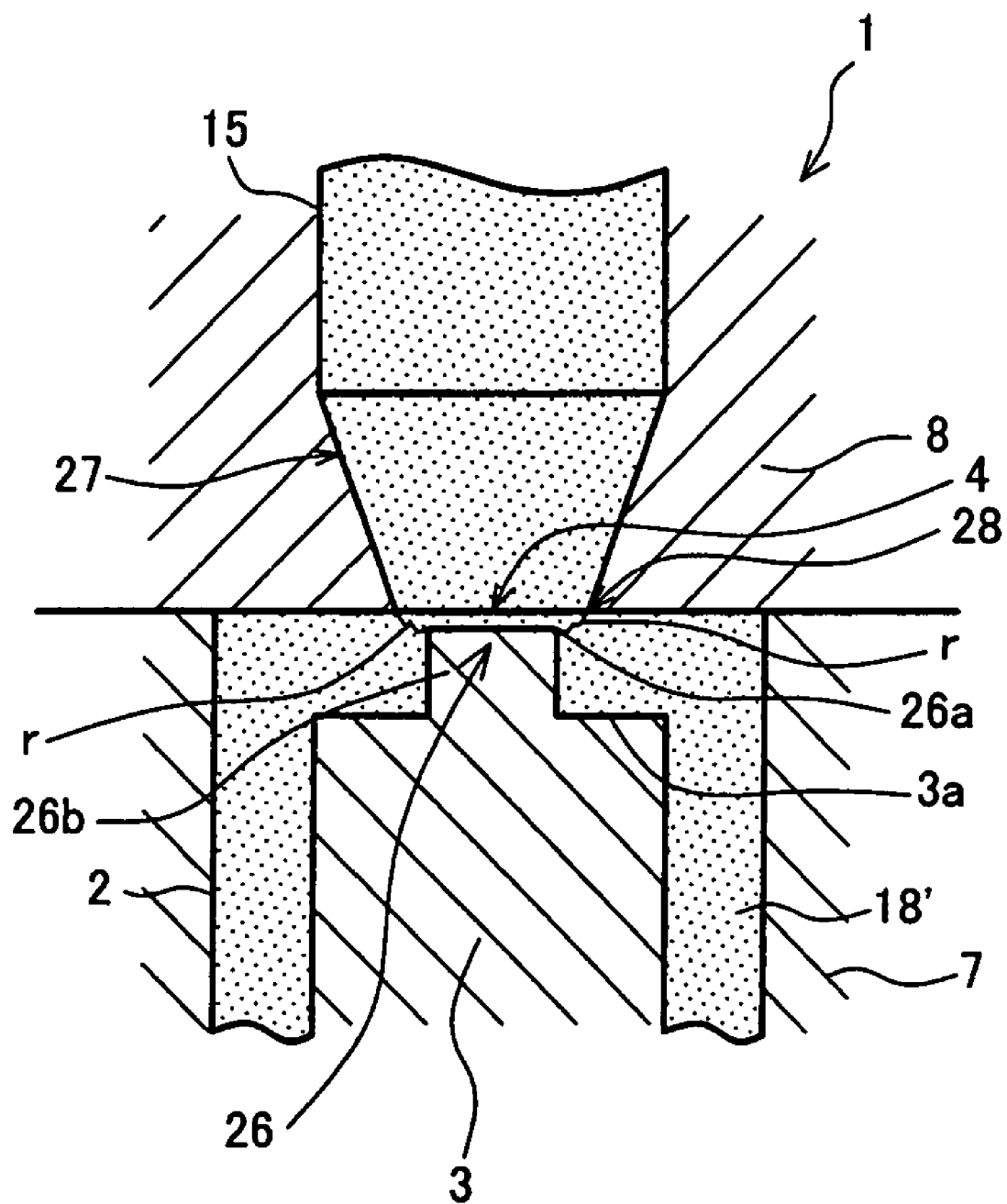
FIG. 10 is a central longitudinal sectional view showing a fifth modification of the cavity of the molding die.

FIG. 10 is a central longitudinal sectional view showing a fifth modification of the cavity 2 of the molding die 1. In the modification, to form the cavity 2, the outside diameter of a top end 26 of the center pin 3 disposed within the cavity 2 is selected to be smaller than the diameter "d" of the gate 4 (about ½, for example), and the top end 26 of the center pin 3 is located close to and in alignment with the center of the gate 4. In this case, a circular rod-like shaft member 26*b* is protruded from the top end face 3*a* of the center pin 3, and the top end 26 is extended toward the center of the gate 4. A length of a distance between an edge 26*a* of the shaft member 26*b* of the center pin 3 and the inner circumference edge of the gate 4 is smaller than an extent of the diameter "d" of the gate 4 (½ through ¼, for example). With the presence of the shaft member 26*b*, when the molten resin 5 is injected into the cavity 2, a portion having a cross sectional area, whose diameter is smaller than the diameter "d", is formed inside the gate 4.

In the modification of FIG. 10, as similarly indicated in the case of FIG. 4, when an upward force is applied to the resin solidified in the gate 4 as indicated by an arrow A, stress concentrates at the portion having the cross sectional area, whose diameter is smaller than the diameter "d", inside the gate 4. Consequently, cracks "r" which are slanted somewhat downwardly occur between the lower end corner 28 of the gate sprue 27 and the edge 26*a* of the shaft member 26*b*. In addition, the portion connecting to the gate 4 is also torn off. As a result, as shown in FIG. 5, a hole 17 is formed in the bottom portion 19*a* of the shaft bore 19 of the resin-product 18. The shaft member 26*b* protruded from the top end face 3*a* of the center pin 3 is not limited in shape to the rod having a circular cross section, but may be the polygonal rod having a square cross section.

In the description thus far made, the resin passage 15 used for injecting the molten resin 5 into the cavity 2 through the gate 4 is provided substantially in alignment with the extension line of the center axis of the center pin 3 disposed within the cavity 2. In an alternative, the resin passage may be slanted at a certain angle with respect to the extension line of the center axis of the center pin 3. In another alternative, the resin passage may be provided in parallel with the extension line of the center axis of the center pin 3, but is horizontally shifted within a range of the diameter of the center pin 3.

While the resin-product 18 to be molded is cylindrical in the descriptions given above, the resin-product 18 may be any resin-product such as a worm gear as long as the resin-product 18 has formed therein the shaft bore 19 to be press fit with the coupling pin as the shaft member or the rotary shaft.

The contents of the Japanese Patent Application No. 2006-026478 filed on Feb. 3, 2006, and the Japanese Patent Application No. 2006-346451 filed on Dec. 22, 2006, that form a basis for claiming the convention priority are incorporated herein as a part of the present application by reference.

I claim:

1. A method for molding a resin-product, comprising the steps of:
    preparing a molding die, the molding die having a die cavity defining a shape of the resin-product provided with a shaft bore extending along the central axis of the resin-product to a predetermined depth and with a bottom portion at one end thereof, a bar-like member having an axis thereof and disposed in the die cavity to define the shaft bore during the molding, a resin flow runner formed outside the die cavity so as to extend toward the die cavity on an extension line of the axis of the bar-like member, a gate sprue in continuation with a terminal end of the resin flow runner, and a gate in continuation to the gate sprue which is formed to fluidly communicate with the die cavity and to inject molten resin supplied from the resin flow runner into the die cavity, the gate having a diameter thereof smaller than that of the gate sprue, the bar-like member being located within the die cavity such that a length of distance from a top end face of the bar-like member to the gate is smaller than an extent of the gate diameter;
    solidifying the molten resin upon being injected from the gate into the die cavity through the resin flow runner; and
    forming a hole in the bottom portion of the shaft bore in the resin-product to penetrate therethrough in a direction of the shaft bore upon tearing off the resin, which is solidified in the resin flow runner, the gate sprue and the gate, in the vicinity of the gate, and also tearing off a resin portion of a resin-product member which connects to the gate when the resin portion is solidified in the die cavity together with the resin-product member.

2. The method for molding a resin-product according to claim 1, wherein the die cavity has an end face thereof defining therein the gate, and wherein the top end face of the bar-like member disposed within the die cavity is placed opposite to and close to the end face of the die cavity defining therein the gate, and a value of a thickness of the bottom portion of the shaft bore in the resin-product member solidified in the cavity is smaller than the extent of the gate diameter.

3. The method for molding a resin-product according to claim 1, wherein the bar-like member disposed within the die cavity is provided, on the top end face thereof, with a protruded portion having a width substantially equal to the extent of the gate diameter, the protruded portion being placed opposite to the gate.

4. The method for molding a resin-product according to claim 3, wherein the protruded part on the top end face of the bar-like member is tapered in its cross section.

5. The method for molding a resin-product according to claim 1, wherein a cut-out groove having a predetermined depth is formed in the resin portion of the resin-product member solidified in the cavity, which resin portion connects to the gate, and the cut-out groove having the predetermined depth being formed around the gate so as to cut in toward an inside of the die cavity.

6. The method for molding a resin-product according to claim 1, wherein a cut-out groove having a predetermined depth, which ranges from the bottom portion of the shaft bore of the resin-product to the gate, is formed in a portion of the resin-product which remains so as to connect the resin-product member solidified in the die cavity with the gate and is substantially dimensioned so as to correspond to the diameter of the gate.

7. The method for molding a resin-product according to claim 1, wherein the top end of the bar-like member disposed within the die cavity has an outside diameter thereof smaller than the diameter of the gate, said top end of the bar-like member being located close to and in alignment with the center of the gate.

* * * * *